(12) United States Patent
Kitagawa et al.

(10) Patent No.: US 7,899,896 B2
(45) Date of Patent: Mar. 1, 2011

(54) METHOD OF SELECTING TYPE OF ELECTRONIC PART AND ELECTRONIC PARTS MAKER SERVER

(75) Inventors: Seiya Kitagawa, Saga (JP); Satoshi Aikawa, Saga (JP)

(73) Assignees: Sanyo Electric Co., Ltd., Moriguchi-shi (JP); Saga Sanyo Industries Co., Ltd., Saga (JP)

( * ) Notice: Subject to any disclaimer, the term of this patent is extended or adjusted under 35 U.S.C. 154(b) by 705 days.

(21) Appl. No.: 11/905,280

(22) Filed: Sep. 28, 2007

(65) Prior Publication Data

US 2008/0033837 A1 Feb. 7, 2008

Related U.S. Application Data

(62) Division of application No. 09/953,427, filed on Sep. 17, 2001, now Pat. No. 7,386,811.

(30) Foreign Application Priority Data

Sep. 18, 2000 (JP) ................................. 2000-282386

(51) Int. Cl.
*G06F 15/173* (2006.01)
(52) U.S. Cl. ............................................ 709/223; 716/4
(58) Field of Classification Search ................ 703/1, 13, 703/14; 705/29; 709/217, 219, 223; 716/1, 716/2, 4
See application file for complete search history.

(56) References Cited

U.S. PATENT DOCUMENTS

| | | | |
|---|---|---|---|
| 5,367,627 A | 11/1994 | Johnson | |
| 5,650,935 A | 7/1997 | Nishino et al. | |
| 5,799,157 A | 8/1998 | Escallon | |
| 5,903,890 A | 5/1999 | Shoji et al. | |
| 5,920,849 A | 7/1999 | Broughton et al. | |
| 6,072,481 A | 6/2000 | Matsushita et al. | |
| 6,073,839 A | 6/2000 | Mori et al. | |
| 6,128,600 A | 10/2000 | Imamura et al. | |
| 6,160,382 A | 12/2000 | Yoon et al. | |
| 6,292,766 B1 | 9/2001 | Mattos et al. | |
| 6,331,779 B2 | 12/2001 | Moore | |
| 6,446,033 B1* | 9/2002 | Tatsumi ......................... | 703/14 |
| 6,493,679 B1* | 12/2002 | Rappaport et al. .............. | 705/29 |
| 6,546,528 B1 | 4/2003 | Sasaki et al. | |

(Continued)

FOREIGN PATENT DOCUMENTS

JP 06-231197 A 8/1994

(Continued)

OTHER PUBLICATIONS

Japanese Notice of Rejection dated Jun. 10, 2008, Application No. 2000-282386.

(Continued)

*Primary Examiner* — Andrew Joseph Rudy
(74) *Attorney, Agent, or Firm* — Westerman, Hattori, Daniels & Adrian, LLP

(57) ABSTRACT

A user provides, in purchasing a predetermined electronic part used for a predetermined electronic circuit from an electronic parts maker, specifications for the predetermined electronic circuit to the electronic parts maker, the electronic parts maker calculates the electrical characteristics of the predetermined electronic part on the basis of the specifications for the predetermined electronic circuit which are provided from the user, and presents to the user the types of electronic part which are adaptable to the calculated electrical characteristics, and the user selects the desirable type from the types of electronic part which are presented by the electronic parts maker.

4 Claims, 4 Drawing Sheets

U.S. PATENT DOCUMENTS

| | | |
|---|---|---|
| 6,561,417 B1 | 5/2003 | Gadd |
| 6,594,799 B1 | 7/2003 | Robertson et al. |
| 6,636,853 B1 | 10/2003 | Stephens, Jr. |
| 6,721,687 B2 | 4/2004 | Bartolome et al. |
| 6,721,769 B1 * | 4/2004 | Rappaport et al. ............ 707/737 |
| 6,754,638 B1 | 6/2004 | Jacobus |
| 6,799,305 B2 | 9/2004 | Abe |
| 6,820,046 B1 | 11/2004 | Lamson et al. |
| 6,882,123 B1 | 4/2005 | Guasch Murillo |
| 6,985,877 B1 | 1/2006 | Hayward et al. |
| 7,085,697 B1 * | 8/2006 | Rappaport et al. ............... 703/13 |
| 7,565,541 B1 * | 7/2009 | Tarbouriech .................. 713/176 |
| 7,596,518 B2 * | 9/2009 | Rappaport et al. .............. 705/29 |
| 7,711,687 B2 * | 5/2010 | Rappaport et al. ............ 709/217 |

FOREIGN PATENT DOCUMENTS

| | | |
|---|---|---|
| JP | 2000-222457 A | 8/2000 |
| JP | 2002-074181 A | 3/2002 |
| TW | 331612 | 5/1998 |
| TW | 381239 | 2/2000 |
| WO | WO 99/50771 | 10/1999 |

OTHER PUBLICATIONS

English language translation of Decision of Rejection for Taiwanese Patent Application No. 090122822 dated Jul. 8, 2003.

Japanese Office Action dated Aug. 3, 2010, issued in corresponding Japanese Patent Application No. 2000-282386.

* cited by examiner

FIG. 3

| TOPOLOGY | | BUCK | BOOST | BUCK-BOOST | FLYBACK |
|---|---|---|---|---|---|
| | | | Continuous Mode $T_s : 1/f_{osc}$ | | |
| D(Duty) | | $\frac{V_{out}}{V_{in}}$ ($T_{on} = D \cdot T_s$) | $\frac{V_{out} - V_{in}}{V_{out}}$ ($T_{on} = D \cdot T_s$) | $\frac{V_{out}}{V_{in} + V_{out}}$ ($T_{on} = D \cdot T_s$) | $\frac{V_{out}}{nV_{in} + V_{out}}$ $n = \frac{n2}{n1}$ ($T_{on} = D \cdot T_s$) |
| $\Delta I_L$ | | $\frac{V_{in} - V_{out}}{L} \cdot T_{on}$ | $\frac{V_{in}}{L} \cdot T_{on}$ | $\frac{V_{in}}{L} \cdot T_{on}$ | $\frac{V_{in}}{nL_1} \cdot T_{on}$ |
| IL peak | | $I_{out} + \frac{1}{2 \cdot L}(V_{in} - V_{out}) \cdot T_{on}$ | $\frac{I_{out}}{1-D} + \frac{V_{in}}{2 \cdot L} \cdot T_{on}$ | $\frac{I_{out}}{1-D} + \frac{V_{in} \cdot T_{on}}{2L}$ | $\frac{I_{out}}{1-D} + \frac{V_{in}}{2nL_1} \cdot T_{on}$ |
| $\Delta V_{ripple}$ | $V_{cr}$ ($= \Delta V_{ripple}$) | $ESR \cdot \frac{V_{in} - V_{out}}{L} \cdot T_{on}$ | $ESR \cdot (\frac{I_{out}}{1-D} + \frac{V_{in} \cdot T_{on}}{2L})$ | $ESR \cdot (\frac{I_{out}}{1-D} + \frac{V_{in} \cdot T_{on}}{2L})$ | $ESR \cdot (\frac{I_{out}}{1-D} + \frac{V_{in}}{2nL_1} \cdot T_{on})$ |
| | $V_{cc}$ ($=\frac{1}{10}\Delta V_{ripple}$) | $\frac{1}{C} \cdot \frac{V_{in} \cdot (V_{in} - V_{out})}{8 \cdot L \cdot V_{out}} \cdot T_{on}^2$ | $\frac{1}{C} \cdot I_{out} \cdot T_{on}$ | $\frac{1}{C} \cdot I_{out} \cdot T_{on}$ | $\frac{1}{C} \cdot I_{out} \cdot T_{on}$ |
| Cout Irms | | $\frac{1}{\sqrt{12}} \cdot \frac{V_{in} - V_{out}}{L} \cdot T_{on}$ | $I_{out} \cdot \sqrt{\frac{D}{1-D}}$ | $I_{out} \cdot \sqrt{\frac{D}{1-D}}$ | $I_{out} \cdot \sqrt{\frac{D}{1-D}}$ |
| Cin Irms | | $I_{out} \cdot \sqrt{D \cdot (1-D)}$ | $\frac{1}{\sqrt{12}} \cdot \frac{V_{in}}{L} T_{on}$ | | $nI_{out} \cdot \sqrt{\frac{D}{1-D}}$ |
| | | 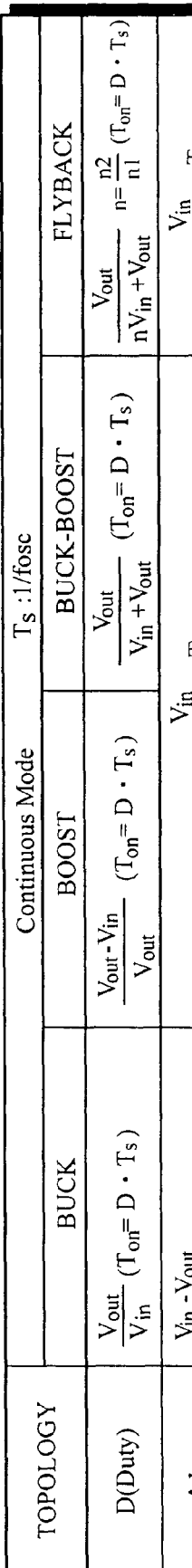 | 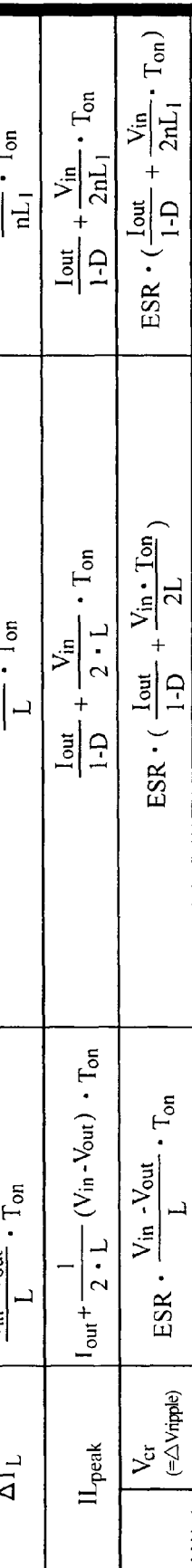 | | 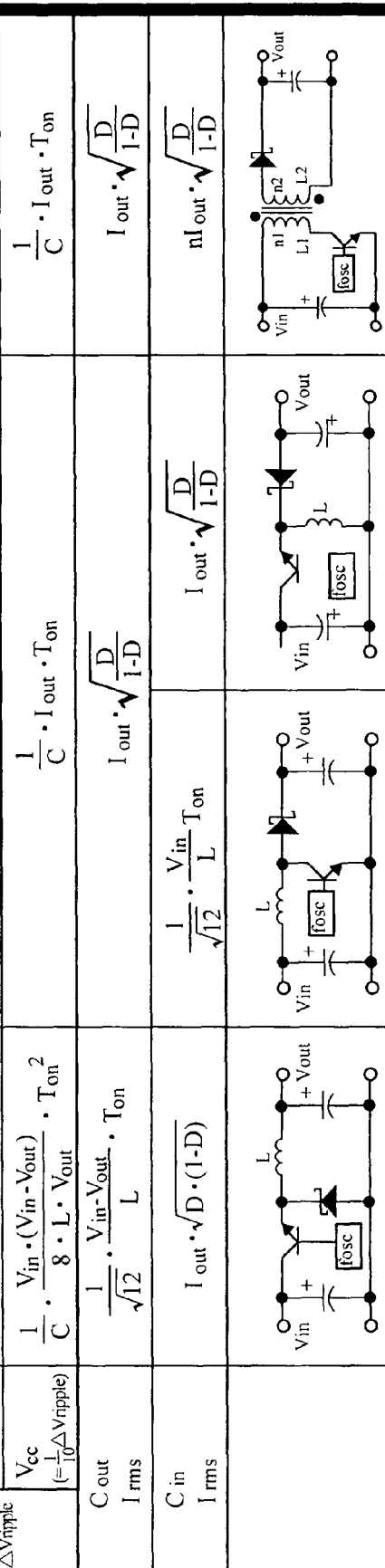 |

US 7,899,896 B2

METHOD OF SELECTING TYPE OF ELECTRONIC PART AND ELECTRONIC PARTS MAKER SERVER

CROSS-REFERENCE TO RELATED APPLICATIONS

This application is a Divisional application of U.S. application Ser. No. 09/953,427, filed Sep. 17, 2001, which claims benefit of Japanese Application No. 2000-282386, filed in Japan on Sep. 18, 2000, the contents of which are hereby incorporated by reference.

BACKGROUND OF THE INVENTION

1. Field of the Invention

The present invention relates to a method of selecting the type of electronic part and an electronic parts maker server.

2. Description of the Prior Art

The type of capacitor used for a power supply circuit, for example, is selected in the following manner. That is, a designer of the power supply circuit (a user of electronic parts) draws up specifications for the power supply circuit. The specifications for the power supply circuit include physical conditions such as the height and the area in mounting of each of the electronic parts in addition to the electrical characteristics of the power supply circuit, for example, a switching frequency, an input voltage, an output voltage, an output current, a ripple voltage, an operating environmental temperature, an inductance value, and a turn ratio (in a case where there is a transformer) of the power supply circuit.

The designer of the power supply circuit calculates the electrical characteristics of the capacitor, for example, capacitance, ESR (Equivalent Series Resistance), and a ripple current on the basis of the electrical characteristics of the power supply circuit which are included in the specifications for the power supply circuit. The type of capacitor is selected from a catalogue created by an electronic parts maker on the basis of the obtained electrical characteristics of the capacitor.

An example of the electronic parts maker is one performing services for providing, to a user who is to purchase a capacitor used for the power supply circuit, information related to the electrical characteristics of the capacitor to be purchased, retrieving the type of capacitor corresponding to the provided electrical characteristics of the capacitor, and presenting the retrieved type to the user.

In order to select the type of capacitor utilizing such services performed by the electronic parts maker, the user must calculate the electric characteristics of the capacitor on the basis of the specifications for the power supply circuit, as in the conventional example. Such services are not so convenient for the user.

SUMMARY OF THE INVENTION

An object of the present invention is to provide a method of selecting the type of electronic part, in which a burden on a user is reduced when the type of predetermined electronic part used for a predetermined electronic circuit is selected, and an electronic parts maker server.

A first method of selecting the type of electronic part according to the present invention is characterized in that a user provides, in purchasing a predetermined electronic part used for a predetermined electronic circuit from an electronic parts maker, specifications for the predetermined electronic circuit to the electronic parts maker, the electronic parts maker calculates the electrical characteristics of the predetermined electronic part on the basis of the specifications for the predetermined electronic circuit which are provided from the user, and presents to the user the types of electronic part which are adaptable to the calculated electrical characteristics, and the user selects the desirable type out of the types of electronic part which are presented by the electronic parts maker.

A second method of selecting the type of electronic part according to the present invention is characterized in that a user provides, in purchasing a capacitor used for a power supply circuit from an electronic parts maker, specifications for the power supply circuit to the electronic parts maker, the electronic parts maker calculates the electrical characteristics of the capacitor on the basis of the specifications for the power supply circuit which are provided from the user, and presents to the user the types of capacitor which are adaptable to the calculated electrical characteristics, and the user selects the desirable type out of the types of capacitor which are presented by the electronic parts maker.

A third method of selecting the type of electronic part according to the present invention is characterized in that a user provides, in purchasing a predetermined electronic part used for a predetermined electronic circuit from an electronic parts maker, specifications for the predetermined electronic circuit to an electronic parts maker server using a user terminal, the electronic parts maker server calculates the electrical characteristics of the predetermined electronic part on the basis of the specifications for the predetermined electronic circuit which are provided from the user terminal, and presents to the user the types of electronic part which are adaptable to the calculated electrical characteristics through the user terminal, and the user performs an operation for selecting the desirable type out of the types of electronic part which are presented to the user through the user terminal so that information related to the desirable type selected by the user is fed to the electronic parts maker server through the user terminal.

A fourth method of selecting the type of electronic part according to the present invention is characterized in that a user provides, in purchasing a capacitor used for a power supply circuit from an electronic parts maker, specifications for the power supply circuit to an electronic parts maker server using a user terminal, the electronic parts maker server calculates the electrical characteristics of the capacitor on the basis of the specifications for the power supply circuit which are provided from the user terminal, and presents to the user the types of capacitor which are adaptable to the calculated electrical characteristics through the user terminal, and the user performs an operation for selecting the desirable type out of the types of capacitor which are presented to the user through the user terminal so that information related to the desirable type selected by the user is fed to the electronic parts maker server through the user terminal.

A first electronic parts maker server according to the present invention is an electronic parts maker server connected to a user terminal through a network, characterized by comprising means for presenting to a user a specification entry screen for causing the user to enter specifications for an electronic circuit into which an electronic part to be purchased by the user is incorporated on the basis of a predetermined instruction from the user terminal, and acquiring from the user terminal the specifications entered by the user on the specification entry screen; and means for calculating the electrical characteristics of the electronic part to be purchased by the user on the basis of the specifications acquired from the user terminal, retrieving from a database the types of electronic part which are adaptable to the calculated electrical characteristics, presenting to the user a retrieval result screen representing the results of the retrieval through the user terminal, and acquiring information related to the type selected by the user on the retrieval result screen.

A second electronic parts maker server according to the present invention is an electronic parts maker server connected to a user terminal through a network, characterized by comprising means for presenting to a user a specification entry screen for causing the user to enter specifications for a power supply circuit into which a capacitor to be purchased by the user is incorporated on the basis of a predetermined instruction from the user terminal, and acquiring from the user terminal the specifications entered by the user on the specification entry screen; and means for calculating the electrical characteristics of the capacitor to be purchased by the user on the basis of the specifications acquired from the user terminal, retrieving from a database the types of capacitor which are adaptable to the calculated electrical characteristics, presenting to the user a retrieval result screen representing the results of the retrieval through the user terminal, and acquiring information related to the type selected by the user on the retrieval result screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a table showing an example of a method of calculating the electrical characteristics of a capacitor.

DESCRIPTION OF THE PREFERRED EMBODIMENTS

Figure 1:
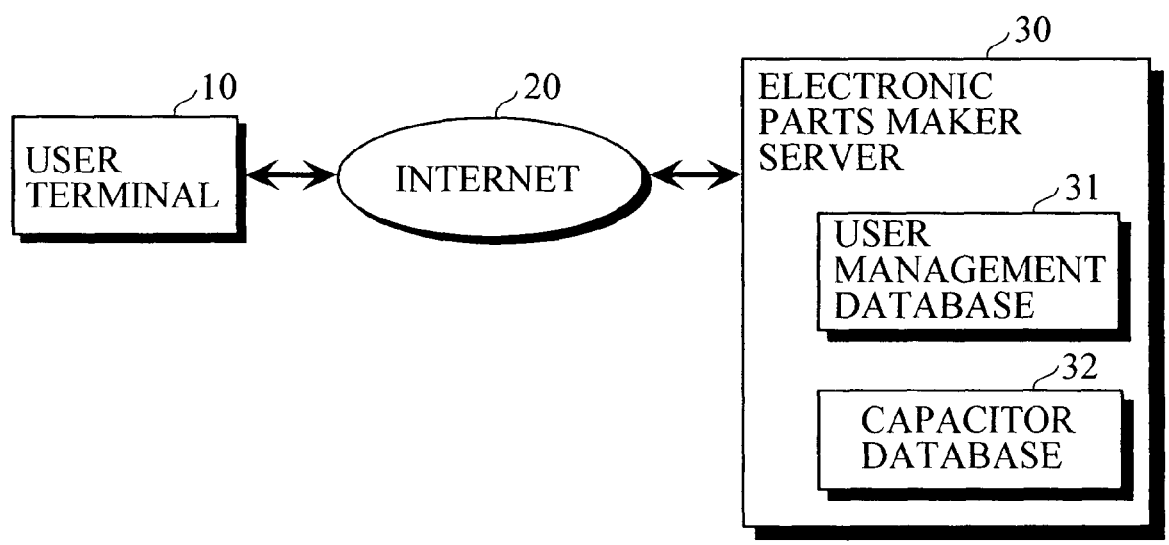
FIG. 1 is a block diagram showing the overall configuration of a system.

Referring now to the drawings, embodiments in a case where the present invention is applied to the selection of the type of capacitor included in a power supply circuit will be described.

[1] Description of First Embodiment

FIG. 1 illustrates the overall configuration of a system.

A user terminal 10 is connected to a Web server of an electronic parts maker (an electronic parts maker server) 30 through the Internet 20. The user terminal 10 comprises a browser for exchanging information with the electronic parts maker server 30. The electronic parts maker server 30 comprises a user management database 31 storing user information registered by a user and a capacitor database 32 storing for each type of capacitor the electrical characteristics, the shape, and the size of the capacitor.

In purchasing the capacitor used for the power supply circuit from the electronic parts maker, the user accesses the electronic parts maker server 30 using the user terminal 10, to acquire a home page (a Web page) provided by the electronic parts maker server 30. A predetermined operation is performed on the home page, whereby a Web page for selecting the type of capacitor (hereinafter referred to as a specification entry screen of the power supply circuit) from the electronic parts maker server 30.

Figure 2:
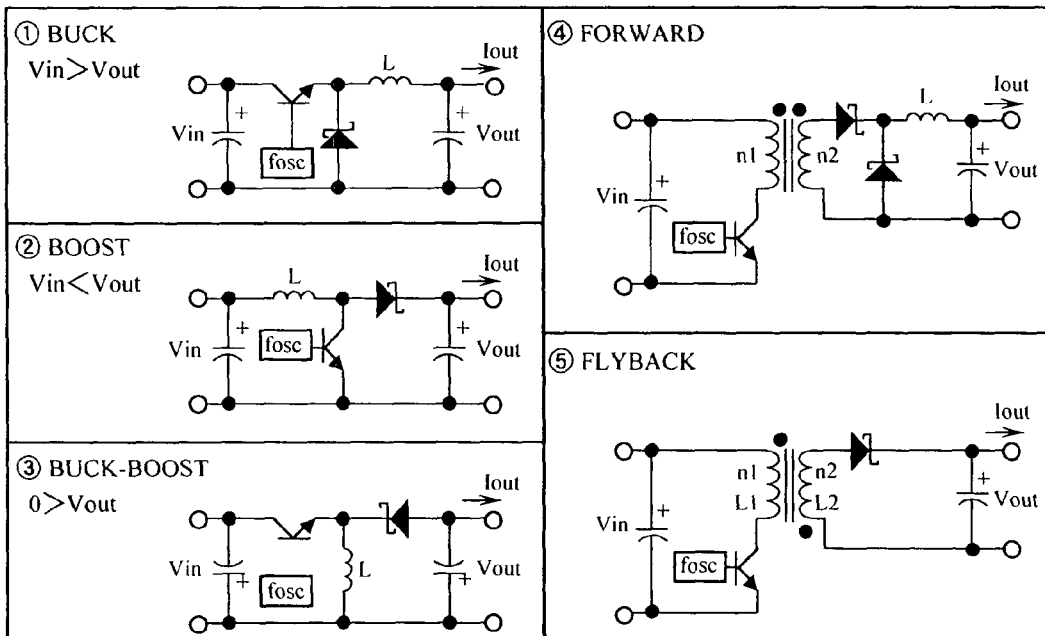
FIG. 2 is a schematic view showing an example of a specification entry screen of an electronic circuit.

FIG. 2 illustrates the specification entry screen of the power supply circuit.

On the specification entry screen of the power supply circuit, an entry portion for entering entries for entering information related to the electrical characteristics of the power supply circuit which are included in specifications for the power supply circuit and the type of power supply circuit is displayed in this example.

The entries for entering the information related to the electrical characteristics of the power supply circuit include:

(1) a switching frequency $f_{osc}$
(2) an input voltage $V_{in}$
(3) an output voltage $V_{out}$
(4) an output current $I_{out}$
(5) a ripple voltage $\Delta V$ripple
(6) an operating environmental temperature Ta
(7) an inductance value L (L1 in the case of a flyback type)
(8) a turn ratio n1:n2

The type of power supply circuit includes five types (① a buck type, ② a boost type, ③ a buck-boost type, ④ a forward type, and ⑤ a flyback type) illustrated in FIG. 2. A numerical value corresponding to the type of power supply circuit is entered into the entry portion for entering the type of power supply circuit.

The user enters, on the specification entry screen of the power supply circuit, the information related to the electrical characteristics of the power supply circuit and the type of power supply circuit, and then clicks a retrieval button. When the retrieval button is clicked by the user, the information entered by the user is sent to the electronic parts maker server 30 from the user terminal 10.

The electronic parts maker server 30 calculates the electrical characteristics of the capacitor used for the power supply circuit on the basis of the information sent from the user terminal 10, retrieves the types of capacitor which are adaptable to the calculated electrical characteristics from the capacitor database 32, and sends information related to the retrieved types of capacitor to the user terminal 10.

The information related to the types of capacitor which has been sent from the electronic parts maker server 30 is displayed as a Web page on the user terminal 10. The user selects the desired type and orders the selected type from the information related to the types of capacitor which is displayed on the user terminal 10. The information related to the type ordered by the user is fed to the electronic parts maker server 30 from the user terminal 10.

FIG. 3 illustrates an example of a method of calculating the electrical characteristics of the capacitor.

The electrical characteristics for specifying the type of capacitor include capacitance C, ESR, and a ripple current $C_{out} I_{rms}$ with respect to an output-side capacitor, and a ripple current $C_{in} I_{rms}$ with respect to an input-side capacitor.

FIG. 3 only illustrates a method of calculating the electrical characteristics of the capacitor with respect to four types, i.e., a buck type, a boost type, a buck-boost type, and a flyback type as the type of power supply circuit. However, the electrical characteristics of the capacitor used for a forward type can be calculated by using $(n2/n1) \cdot V_{in}$ in place of $V_{in}$ in the buck type and using $(n2/n1) \cdot I_{out}$ in place of $I_{out}$ in $C_{in} I_{rms}$ in the buck type.

[2] Description of Second Embodiment

Although in the above-mentioned first embodiment, information is exchanged between the user terminal 10 and the electronic parts maker server 30 through the Internet, to cause the user to select the type of capacitor, the user may be caused to select the type of capacitor in the following manner.

Specifically, an electronic parts maker prepares a personal computer which is equipped with application software for selecting the type of capacitor. An example of the application software for selecting the type of capacitor is one having the function of displaying a specification entry screen of a power supply circuit as shown in FIG. 2 and inputting specifications for the power supply circuit used by the user, the function of automatically calculating the electrical characteristics of a capacitor used for the power supply circuit on the basis of the inputted specifications for the power supply circuit, and the function of retrieving from a capacitor database in the personal computer the types of capacitor which are adaptable to the calculated electrical characteristics and presenting the retrieved types of capacitor.

A sales representative in the electronic parts maker talks business with the user for the purchase of the personal computer which is equipped with the application software for selecting the type of capacitor, causes the personal computer to display the specification entry screen of the power supply circuit, and enters the specifications for the power supply circuit used by the user. The personal computer automatically calculates the electrical characteristics of the capacitor used for the power supply circuit on the basis of the specifications for the power supply circuit which are entered on the specification entry screen. The personal computer retrieves from the capacitor database in the personal computer the types of capacitor which are adaptable to the calculated electrical characteristics, and presents the retrieved types of capacitor.

The sales representative has the user select, out of the types of capacitor which are presented by the personal computer, the desirable type, and orders the selected type.

[3] Description of Third Embodiment

Figure 4:
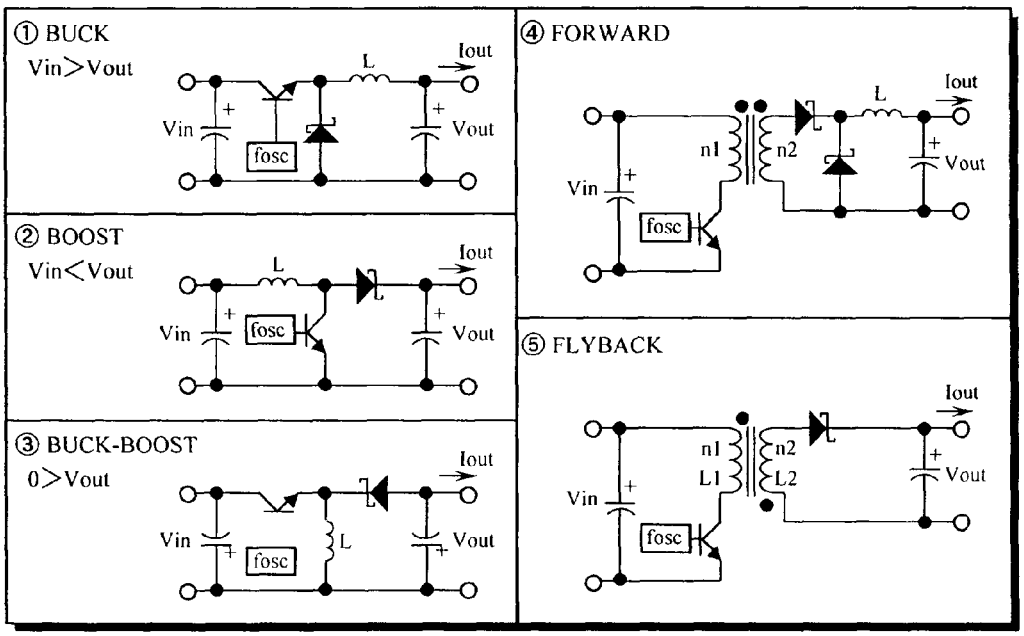
FIG. 4 is a schematic view showing an example of a hearing sheet for selecting the type of capacitor.

In the third embodiment, an electronic parts maker distributes to a user a hearing sheet for selecting the type of capacitor as shown in FIG. 4 in order to obtain information related to the specifications for a power supply circuit from a user. Examples of a method of distributing the hearing sheet include a method of assigning the hearing sheet to a catalogue of capacitors and mailing the catalog to the user, and a method of sending to the user only the hearing sheet by mail or facsimile.

The hearing sheet is provided with an entry space into which information related to the user (a company name, a department name, a name, a telephone number, a facsimile number, e-mail) are entered and an entry space into which information related to the electrical characteristics of the power supply circuit which are included in specifications for the power supply circuit is entered, and circuit diagrams of various types of power supply circuits are described on the hearing sheet. With respect to the type of power supply circuit to be used, the user is instructed to assign a ◯ mark to the corresponding circuit diagram.

The user enters necessary items into the hearing sheet and sends the hearing sheet to the electronic parts maker by facsimile or mail when the capacitor used for the power supply circuit is purchased from the electronic parts maker.

The electronic parts maker calculates the electrical characteristics of the capacitor used for the power supply circuit, that is, capacitance C, ESR, a ripple current $C_{out}I_{rms}$ for an output-side capacitor, and a ripple current $C_{in}I_{rms}$ for an input-side capacitor, selects the types of capacitor which are adaptable to the calculated electrical characteristics, and presents the selected types to the user on the basis of contents entered into the hearing sheet sent from the user. Examples of the presenting method include facsimile and mail.

The user selects the desirable type out of the types of capacitor which are presented from the electronic parts maker, and orders the selected type from the electronic parts maker.

Although description was made of a case where the type of capacitor used for the power supply circuit is selected, the present invention is not limited to the same. The present invention is applicable to a case where the type of electronic part used for each type of electronic circuit is selected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic parts maker server connected to a user terminal through a network, comprising:
   means for presenting to a user a specification entry screen for causing the user to enter specifications for an electronic circuit into which an electronic part to be purchased by the user is incorporated on the basis of a predetermined instruction from the user terminal, and acquiring from the user terminal the specifications for the electronic circuit entered by the user on the specification entry screen; and
   means for calculating the electrical characteristics of the electronic part to be purchased by the user on the basis of the specifications for the electronic circuit acquired from the user terminal, retrieving from a database the types of electronic parts which are adaptable to the calculated electrical characteristics, presenting to the user a retrieval result screen representing the results of the retrieval through the user terminal, and acquiring information related to the type of electronic part selected by the user on the retrieval result screen.

2. An electronic parts maker server connected to a user terminal through a network, comprising:
   means for presenting to a user a specification entry screen for causing the user to enter specifications for a power supply circuit into which a capacitor to be purchased by the user is incorporated on the basis of a predetermined instruction from the user terminal, and acquiring from the user terminal the specifications for the power supply circuit entered by the user on the specification entry screen; and
   means for calculating the electrical characteristics of the capacitor to be purchased by the user on the basis of the specifications for the power supply terminal acquired from the user terminal, retrieving from a database the types of capacitors which are adaptable to the calculated electrical characteristics, presenting to the user a retrieval result screen representing the results of the retrieval through the user terminal, and acquiring information related to the type of capacitor selected by the user on the retrieval result screen.

3. An electronic parts maker server connected to a user terminal through a network, comprising:
   a processing device that presents to a user a specification entry screen for causing the user to enter specifications for an electronic circuit into which an electronic part to be purchased by the user is incorporated on the basis of a predetermined instruction from the user terminal, and that acquires from the user terminal the specifications for the electronic circuit entered by the user on the specification entry screen; and a processing device that calculates the electrical characteristics of the electronic part to be purchased by the user on the basis of the specifications acquired from the user terminal, retrieves from a database the types of electronic parts which are adaptable to the calculated electrical characteristics, presents to the user a retrieval result screen representing the results of the retrieval through the user terminal, and acquires information related to the type of electronic part selected by the user on the retrieval result screen.

4. An electronic parts maker server connected to a user terminal through a network, comprising:

a processing device that presents to a user a specification entry screen for causing the user to enter specifications for a power supply circuit into which a capacitor to be purchased by the user is incorporated on the basis of a predetermined instruction from the user terminal, and that acquires from the user terminal the specifications for the power supply circuit entered by the user on the specification entry screen; and a processing device that calculates the electrical characteristics of the capacitor to be purchased by the user on the basis of the specifications acquired from the user terminal, retrieves from a database the types of capacitors which are adaptable to the calculated electrical characteristics, presents to the user a retrieval result screen representing the results of the retrieval through the user terminal, and acquires information related to the type of capacitor selected by the user on the retrieval result screen.

* * * * *